(12) United States Patent
Saito et al.

(10) Patent No.: US 8,798,019 B2
(45) Date of Patent: Aug. 5, 2014

(54) WIRELESS COMMUNICATION DEVICE, WIRELESS COMMUNICATION METHOD, PROGRAM, AND WIRELESS COMMUNICATION SYSTEM

(75) Inventors: Erika Saito, Tokyo (JP); Hideyuki Suzuki, Tokyo (JP); Yuichi Kageyama, Tokyo (JP); Masanori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 13/071,717

(22) Filed: Mar. 25, 2011

(65) Prior Publication Data

US 2011/0280152 A1 Nov. 17, 2011

(30) Foreign Application Priority Data

May 17, 2010 (JP) ................................. 2010-113416

(51) Int. Cl.
*H04W 4/00* (2009.01)
(52) U.S. Cl.
USPC ........... 370/338; 370/245; 370/350; 370/349; 709/205; 709/218
(58) Field of Classification Search
None
See application file for complete search history.

(56) References Cited

U.S. PATENT DOCUMENTS

| 2009/0240781 | A1 | 9/2009 | Otsuka |
| 2011/0026504 | A1* | 2/2011 | Feinberg ........................ 370/338 |
| 2011/0082905 | A1* | 4/2011 | Wentink et al. ................ 709/205 |

FOREIGN PATENT DOCUMENTS

| JP | 2008-283590 | 11/2008 |
| WO | WO 2007/061140 A1 | 5/2007 |

OTHER PUBLICATIONS

U.S. Appl. No. 13/409,437, filed Mar. 1, 2012, Saito, et al.
U.S. Appl. No. 13/401,166, filed Feb. 21, 2012, Saito, et al.
Extended Search Report issued Oct. 19, 2011 in European Application No. 11159892.6.

* cited by examiner

*Primary Examiner* — Ian N Moore
*Assistant Examiner* — Eric H Wang
(74) *Attorney, Agent, or Firm* — Oblon, Spivak, McClelland, Maier & Neustadt, L.L.P.

(57) ABSTRACT

Provided is a wireless communication device including a control unit that controls the wireless communication device to act as a group owner or a client, and a communication unit that communicates with another wireless communication device according to control by the control unit, and, when a communication group having a topology where the wireless communication device acts as a group owner and the another wireless communication device acts as a client of the wireless communication device is formed, and a new wireless communication device to enter the communication group appears, the control unit determines whether or not to change a topology of the communication group.

9 Claims, 8 Drawing Sheets

WIRELESS COMMUNICATION DEVICE, WIRELESS COMMUNICATION METHOD, PROGRAM, AND WIRELESS COMMUNICATION SYSTEM

BACKGROUND OF THE INVENTION

1. Field of the Invention

The present invention relates to a wireless communication device, a wireless communication method, a program, and a wireless communication system.

2. Description of the Related Art

A wireless LAN (Local Area Network) system as typified by IEEE (Institute of Electrical and Electronics Engineers) 802.11 is becoming increasingly common in place of a wired network for its advantages such as high flexibility of equipment. As described in Japanese Unexamined Patent Publication No. 2008-283590, for example, a wireless LAN system standardized by the IEEE 802.11 is composed of a group of wireless communication devices including an access point operating as a group owner and a plurality of stations operating as clients and a plurality of stations are connected to one access point. In such a wireless LAN system, it is decided that the access point acts as a group owner, and the stations act as clients.

On the other hand, Wi-Fi Direct under Wi-Fi Alliance standard development is designed to form a communication group through direct connection of a plurality of communication devices, and when forming the communication group, it is decided which of a group owner and a client each of the plurality of wireless communication devices acts as. For example, each wireless communication device decides which of a group owner and a client the device acts as by exchanging a weight indicating priority to act as a group owner with another wireless communication device and comparing the weights indicating priority.

SUMMARY OF THE INVENTION

However, because it is expected that the wireless communication devices that make up the communication group are ever changing, a topology best suited to the communication group would change as well. For example, consider the case where, when a first wireless communication device that acts as a group owner and a second wireless communication device that acts as a client of the first wireless communication device form a communication group, a third wireless communication device that intends to communicate with the second wireless communication device appears. In such a case, if the first wireless communication device keeps acting as the group owner without changing the topology of the communication group, the third wireless communication device and the second wireless communication device need to communicate through the first wireless communication device acting as the group owner, and thus a communication channel is complicated, which incurs waste.

In light of the foregoing, it is desirable to provide novel and improved wireless communication device, wireless communication method, program, and wireless communication system capable of changing the topology of a communication group according to a change in wireless communication devices that make up the communication group.

According to an embodiment of the present invention, there is provided a wireless communication device comprising a control unit that controls the wireless communication device to act as a group owner or a client, and a communication unit that communicates with another wireless communication device according to control by the control unit, wherein, when a communication group having a topology where the wireless communication device acts as a group owner and the another wireless communication device acts as a client of the wireless communication device is formed, and a new wireless communication device to enter the communication group appears, the control unit determines whether or not to change the topology of the communication group.

The communication unit may receive service information indicating a service provided by each of the another wireless communication device and the new wireless communication device, and the control unit may determine whether or not to change the topology of the communication group based on the service information of the another wireless communication device and the new wireless communication device.

When the wireless communication device is compatible with the service provided by the new wireless communication device, the control unit may control the wireless communication device to keep acting as a group owner.

When the wireless communication device and the another wireless communication device both are not compatible with the service provided by the new wireless communication device, the control unit may control the wireless communication device to keep acting as a group owner.

When the wireless communication device is not compatible with the service provided by the new wireless communication device and the another wireless communication device is compatible with the service provided by the new wireless communication device, the control unit may decide to make the another wireless communication device act as a group owner.

When the control unit decides to make the another wireless communication device act as a group owner, the communication unit may transmit information indicating the another wireless communication device.

After transmission of the information by the communication unit, the control unit may control the wireless communication device to leave the communication group and form a communication group where the wireless communication device acts as a client again with the another wireless communication device.

According to another embodiment of the present invention, there is provided a wireless communication method comprising a step of when a communication group having a topology where a wireless communication device acts as a group owner and another wireless communication device acts as a client of the wireless communication device is formed, and a new wireless communication device to enter the communication group appears, determining whether or not to change the topology of the communication group by the wireless communication method.

According to another embodiment of the present invention, there is provided a program causing a computer to function as a wireless communication device comprising a control unit that controls the wireless communication device to act as a group owner or a client, and a communication unit that communicates with another wireless communication device according to control by the control unit, wherein, when a communication group having a topology where the wireless communication device acts as a group owner and the another wireless communication device acts as a client of the wireless communication device is formed, and a new wireless communication device to enter the communication group appears, the control unit determines whether or not to change the topology of the communication group.

According to another embodiment of the present invention, there is provided a wireless communication system comprising a first wireless communication device, and a second wireless communication device, wherein, when a communication group having a topology where the first wireless communication device acts as a group owner and the second wireless communication device acts as a client of the first wireless communication device is formed, and a new wireless communication device to enter the communication group appears, the first wireless communication device determines whether or not to change the topology of the communication group.

According to the embodiments of the present invention described above, it is possible to change the topology of a communication group according to a change in wireless communication devices that make up the communication group.

DETAILED DESCRIPTION OF THE EMBODIMENT(S)

Figure 1:
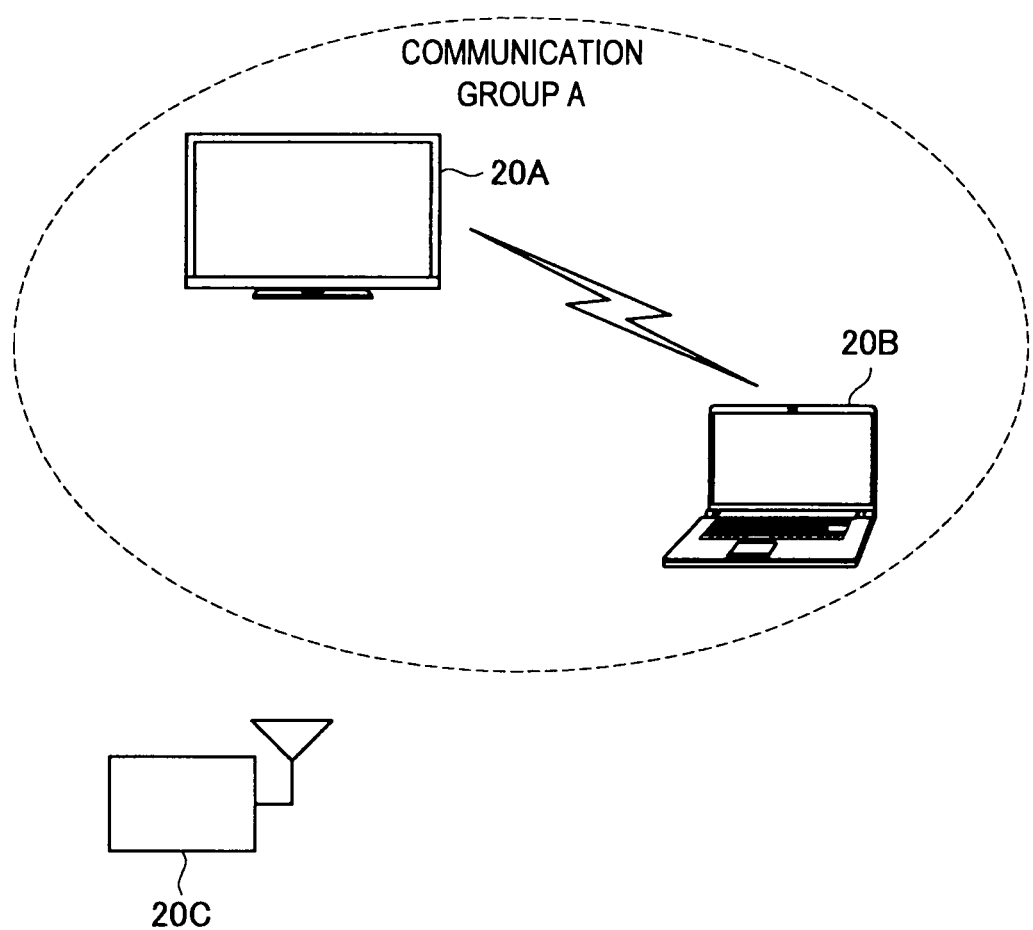
FIG. 1 is an explanatory view showing a structure example of a communication group according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like wireless communication devices 20A, 20B and 20C where necessary. However, when there is no particular need to distinguish between a plurality of structural elements having substantially the same function, they are denoted only by the same reference numeral. For example, when there is no particular need to distinguish between the wireless communication devices 20A, 20B and 20C, they are referred to simply as the wireless communication device 20.

Preferred embodiments of the present invention will be described hereinafter in the following order.

1. Outline of Embodiment of Present Invention

2. Configuration of Wireless Communication Device according to Embodiment of Present Invention 3. Operation of Wireless Communication Device according to Embodiment of Present Invention 4. Specific Example of Topology Structure
(First Example)
(Second Example)

5. Summary

<1. Outline of Embodiment of Present Invention>

The outline of an embodiment of the present invention is schematically described hereinafter with reference to FIG. 1.

FIG. 1 is an explanatory view showing a structure example of a communication group according to an embodiment of the present invention. In the example shown in FIG. 1, a wireless communication device 20A, which is a display device, forms a common communication group A with a wireless communication device 20B, which is a PC (Personal Computer), and can communicate wirelessly with the wireless communication device 20B.

In the case of displaying content data stored in the wireless communication device 20B on the wireless communication device 20A in the communication group A, the wireless communication device 20B is a supply source of the content data. Therefore, in DLNA (Digital Living Network Alliance), a PC like the wireless communication device 20B is categorized as DMS (Digital Media Server), and a display device (a television device or a wireless monitor) like the wireless communication device 20A is categorized as DMR (Digital Media Renderer). Further, the PC is categorized not only as DMS but also as DMR.

Although the display device and the PC are illustrated as the wireless communication device 20 in FIG. 1, the wireless communication device 20 is not limited thereto. For example, the wireless communication device 20 may be an information processing device such as a mobile phone, a portable music playback device, a home video processing device (e.g. a DVD recorder, a videocassette recorder etc.), a home video display device, a PDA (Personal Digital Assistants), a home game device, an electrical household appliance, a portable video processing device or a portable game device.

Further, in a system that decides a parentage before forming a communication group, the wireless communication device 20 which is not an access point can also act as a group owner. For example, each wireless communication device 20 decides which of a group owner and a client the device acts as by exchanging a weight indicating priority to act as a group owner with another wireless communication device 20 and comparing the weights indicating priority. Then, the wireless communication device 20 which is decided to act as a group owner transmits a beacon and can make connection with a plurality of wireless communication devices 20 to act as clients.

It is now assumed that the communication group A is formed in which the wireless communication device 20A acts as a group owner and the wireless communication device 20B acts as a client. Then, consider the case where a wireless communication device 20C, which is DMR, shown in FIG. 1 makes a new entry into the communication group A in order to display the content data stored in the wireless communication device 20B. In this case, according to a comparative example with the present invention, a topology (connection model) shown in FIG. 2 is formed.

Figure 2:
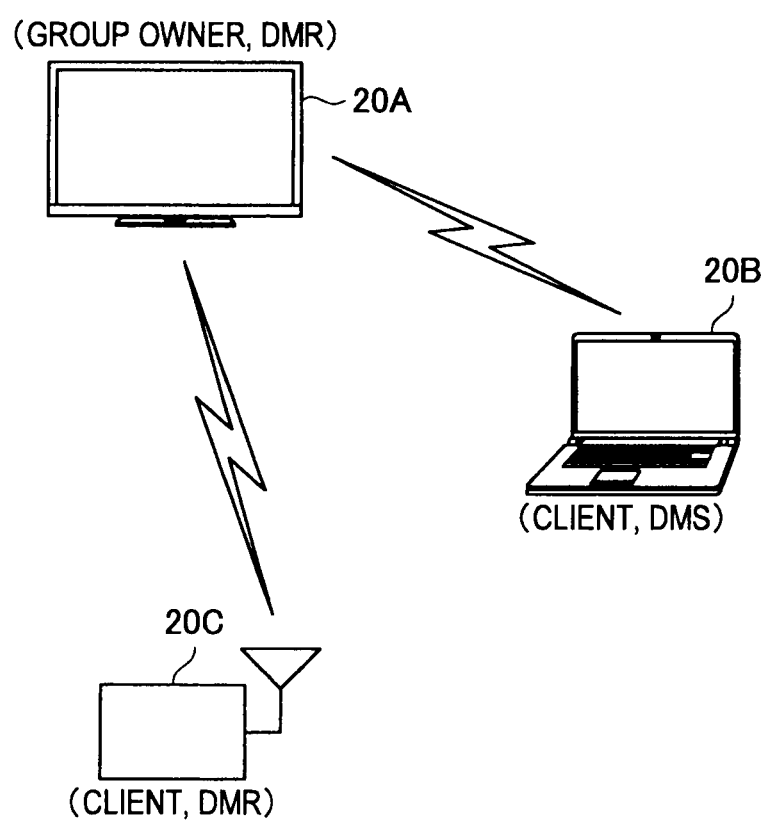
FIG. 2 is an explanatory view showing a topology formed by a comparative example with the present invention.

FIG. 2 is an explanatory view showing the topology formed by the comparative example with the present invention. As shown in FIG. 2, in the comparative example with the present invention, the wireless communication device 20C that makes a new entry into the communication group A is connected to the wireless communication device 20A, as a client of the wireless communication device 20A that is acting as a group owner. Then, the wireless communication device 20C communicates with the wireless communication device 20B through the wireless communication device 20A and can thereby display the content data stored in the wireless communication device 20B.

However, in the topology shown in FIG. 2, it is necessary to transmit the content data of the wireless communication device 20B to the wireless communication device 20C through the wireless communication device 20A. This raises a problem that the channel is complicated and unnecessary communication is happening.

Given such circumstances, the wireless communication device 20 according to an embodiment of the present invention has been invented. The wireless communication device 20 according to the embodiment of the present invention can change the topology of a communication group according to a change in wireless communication devices that make the communication group. The wireless communication device 20 having such a feature is described hereinafter in detail.

<2. Configuration of Wireless Communication Device According to Embodiment of Present Invention>

First, a hardware configuration of the wireless communication device 20 according to the embodiment of the present invention is described with reference to FIG. 3.

Figure 3:
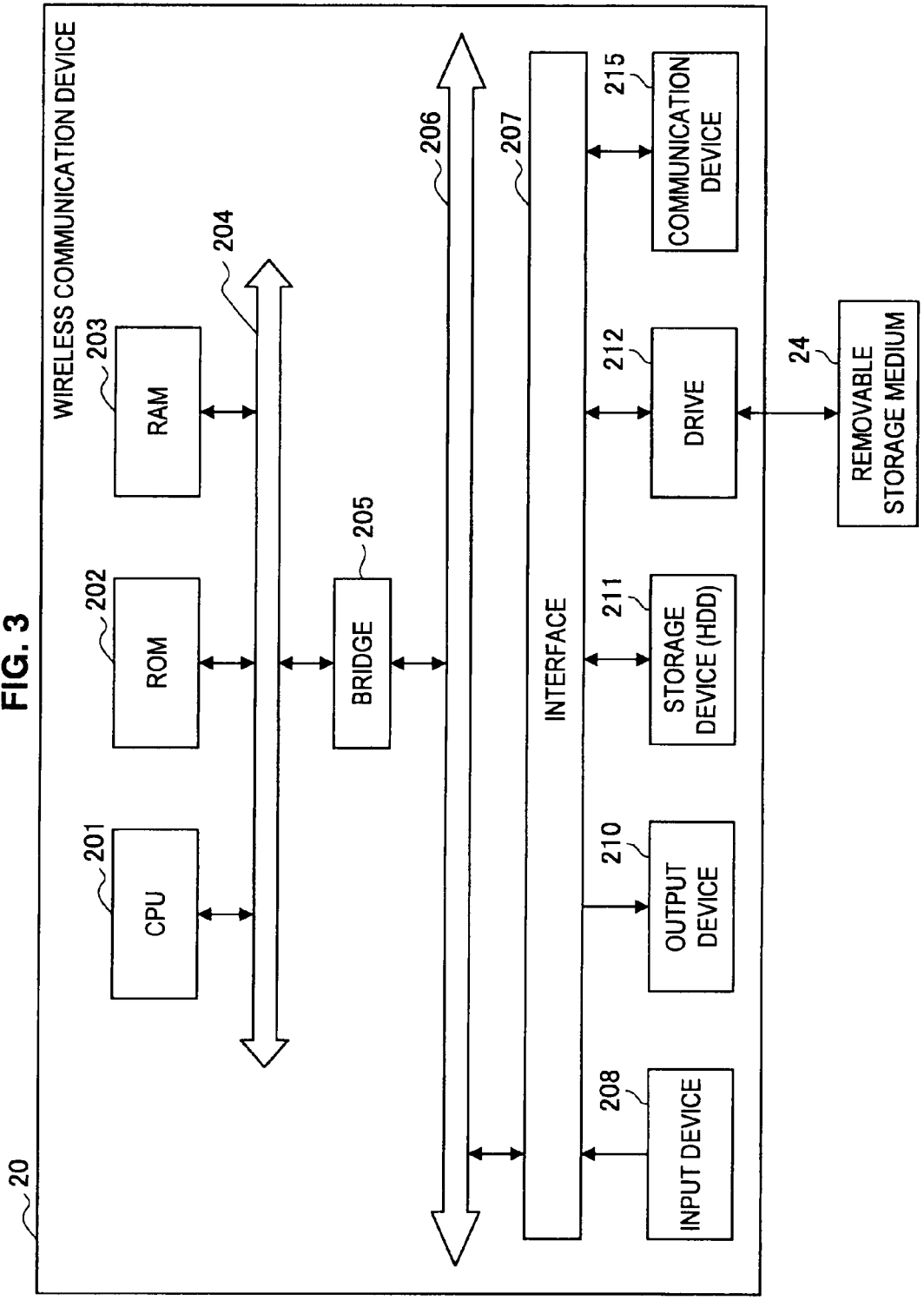
FIG. 3 is a block diagram showing a hardware configuration of a wireless communication device.

FIG. 3 is a block diagram showing a hardware configuration of the wireless communication device 20. The wireless communication device 20 includes a CPU (Central Processing Unit) 201, a ROM (Read Only Memory) 202, a RAM (Random Access Memory) 203, and a host bus 204. The wireless communication device 20 further includes a bridge 205, an external bus 206, an interface 207, an input device 208, an output device 210, a storage device (HDD) 211, a drive 212, and a communication device 215.

The CPU 201 serves as a processing device and a control device, and it controls the overall operations in the wireless communication device 20 according to various kinds of programs. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. Note that the host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch, or a lever, and an input control circuit that generates an input signal based on a user input and outputs it to the CPU 201, for example. A user of the wireless communication device 20 manipulates the input device 208 to thereby input various kinds of data or direct a processing operation to the wireless communication device 20.

The output device 210 includes a display device such as a CRT (Cathode Ray Tube) display device, an LCD (Liquid Crystal Display) device, an OLED (Organic Light Emitting Display) device or a lamp. Further, the output device 210 includes a sound output device such as a speaker or a headphone. The output device 210 outputs reproduced contents, for example. Specifically, the display device displays various kinds of information such as reproduced video data by texts or images. On the other hand, the sound output device converts reproduced sound data or the like into sound and outputs the sound.

The storage device 211 is a device for data storage that is configured as an example of a storage unit of the wireless communication device 20 according to the embodiment. The storage device 211 may include a storage medium, a recording device that records data into the storage medium, a reading device that reads data from the storage medium, a deleting device that deletes data recorded in the storage medium or the like. The storage device 211 may be an HDD (Hard Disc Drive), for example. The storage device 211 drives a hard disk and stores a program to be executed by the CPU 201 or various data.

The drive 212 is a reader/writer for a storage medium, and it may be built in the wireless communication device 20 or attached externally. The drive 212 reads information that is recorded on a removable storage medium 24 such as a magnetic disk, an optical disk, a magneto-optical disk or a semiconductor memory which is attached thereto and outputs the information to the RAM 203. Further, the drive 212 may write information into the removable storage medium 24.

The communication device 215 is a communication interface that includes a communication device or the like to establish connection with other wireless communication devices, for example. The communication device 215 may be a communication device compatible with a wireless LAN (Local Area Network).

The hardware configuration of the wireless communication device 20 according to the embodiment of the present invention is described above. Next, the configuration of the wireless communication device 20 according to the embodiment of the present invention is described functionally with reference to FIG. 4.

Figure 4:
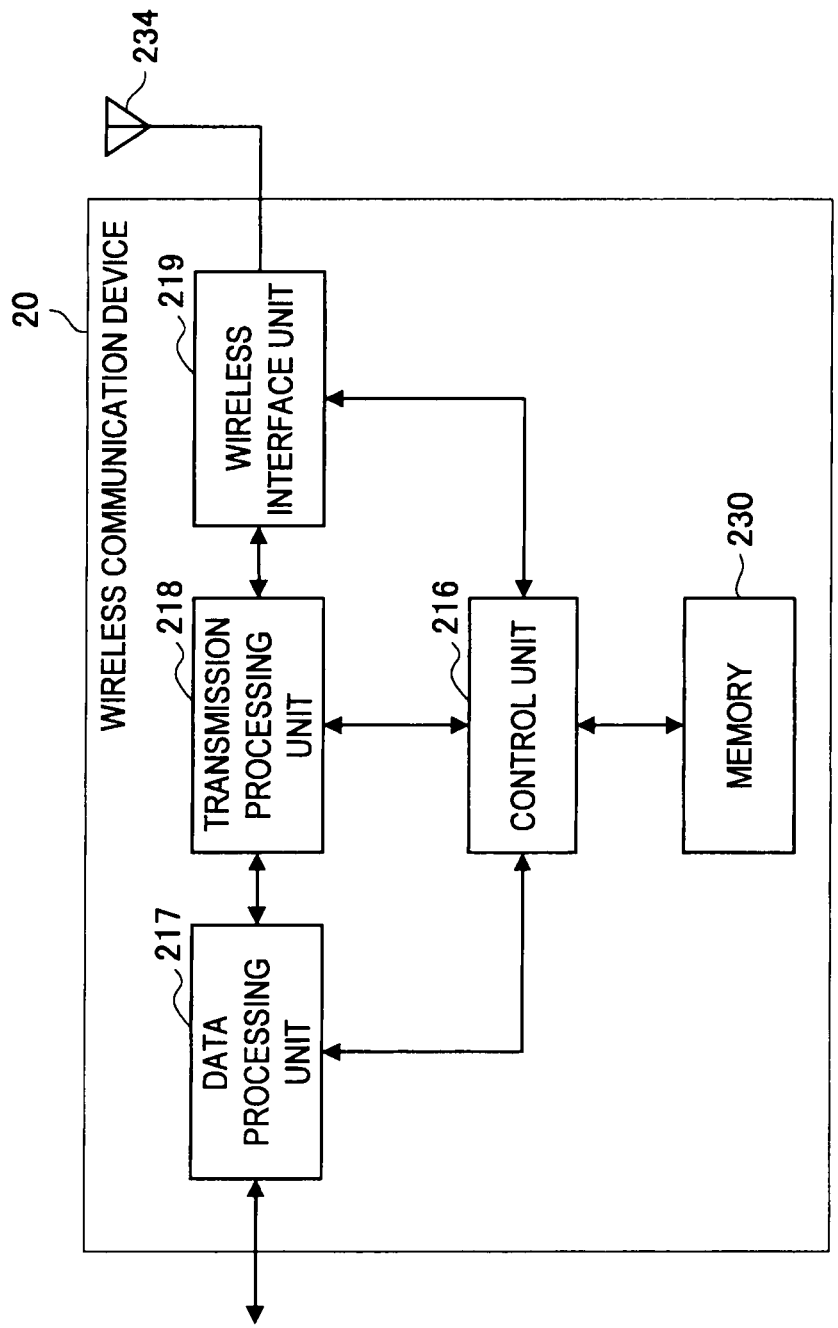
FIG. 4 is a functional block diagram showing a configuration of a wireless communication device according to an embodiment of the present invention.

FIG. 4 is a functional block diagram showing the configuration of the wireless communication device 20 according to the embodiment of the present invention. As shown in FIG. 4, the wireless communication device 20 includes a data processing unit 217, a transmission processing unit 218, a wireless interface unit 219, a control unit 216, a memory 230, and an antenna 234.

In transmitting operation, the data processing unit 217 creates various data frames and data packets in response to a request from an upper layer, for example, and supplies them to the transmission processing unit 218. The transmission processing unit 218 performs, during transmission, processing such as addition of various data headers or an error detecting code such as FCS (Frame Check Sequence) to the packets created by the data processing unit 217 and then provides the processed data to the wireless interface unit 219. The wireless interface unit 219 generates a modulation signal in a frequency band of a carrier wave from the data received from the transmission processing unit 218 and transmits the signal as a radio signal from the antenna 234.

Further, in receiving operation, the wireless interface unit 219 performs down-conversion of a radio signal received by the antenna 234 and converts the signal into a bit string to thereby decode various data frames. The transmission processing unit 218 analyzes headers added to the various data frames supplied from the wireless interface unit 219 and, confirming that there is no error in the data frames based on the error detecting code, supplies the various data frames to the data processing unit 217. The data processing unit 217 processes and analyzes the various data frames and data packets supplied from the transmission processing unit 218. In this manner, the data processing unit 217, the transmission processing unit 218, the wireless interface unit 219 and the antenna 234 function as a communication unit.

The control unit 216 controls the receiving operation and the transmitting operation of the data processing unit 217, the transmission processing unit 218, and the wireless interface unit 219. For example, the control unit 216 performs operations such as decision of a use frequency, instruction for creation or transmission of control messages, interpretation of control messages, and control of connection processing. Note that in the case where the wireless communication device 20 can operate both as a client and a group owner, the control message may be annunciation information such as a beacon, an acknowledgement of a beacon, a probe request, a probe response, a service inquiry packet, and a service response packet.

Further, the control unit 216 controls role negotiation (negotiation for deciding which of a group owner and a client the device acts as), which is performed when making up a communication group with another wireless communication device 20.

Furthermore, when the wireless communication device 20 is acting as a group owner and a new wireless communication device 20 which makes a new entry into the communication group appears, the control unit 216 determines whether or not to change the topology of the communication group. For the determination, the control unit 216 uses service information indicating the service (DMS, DMR etc.) provided by each wireless communication device 20, which is acquired by transmission and reception of a service inquiry packet and a service response packet, for example.

Then, when the control unit 216 determines to change the topology of the communication group, it controls a process for re-forming the communication group. The determination as to whether or not to change the topology and the process for re-forming the communication group are described in detail later in <3. Operation of Wireless Communication Device according to Embodiment of Present Invention>.

The memory 230 has a role of a working area of data processing by the control unit 216 and a function of a storage medium that stores various kinds of data. The memory 230 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

<3. Operation of Wireless Communication Device According to Embodiment of Present Invention>

The configuration of the wireless communication device 20 according to the embodiment of the present invention is described above. Next, the operation of the wireless communication device 20 according to the embodiment of the present invention is described with reference to FIGS. 5 and 6.

Figure 5:
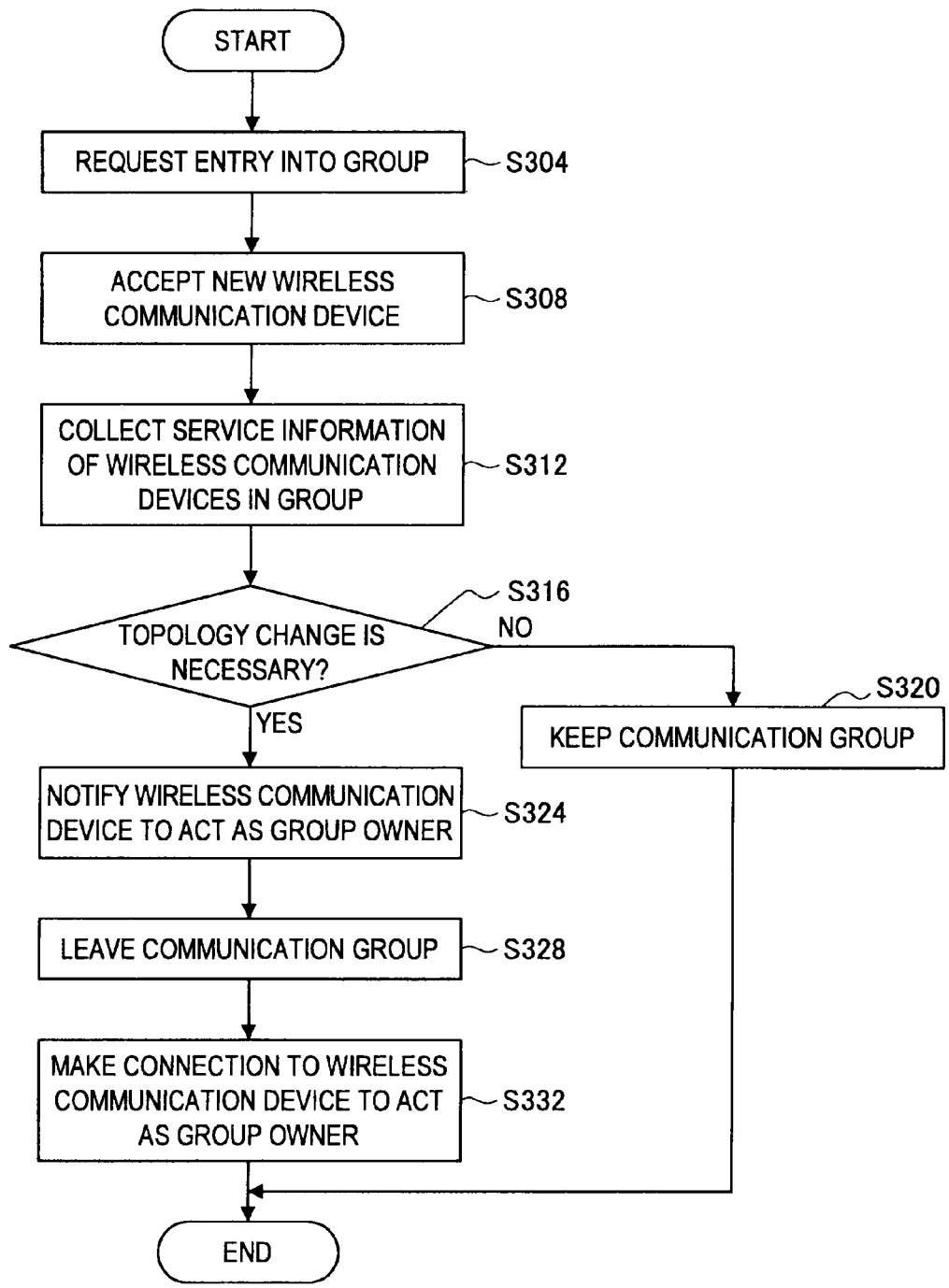
FIG. 5 is a flowchart showing an operation of a wireless communication device according to an embodiment of the present invention.
Figure 6:
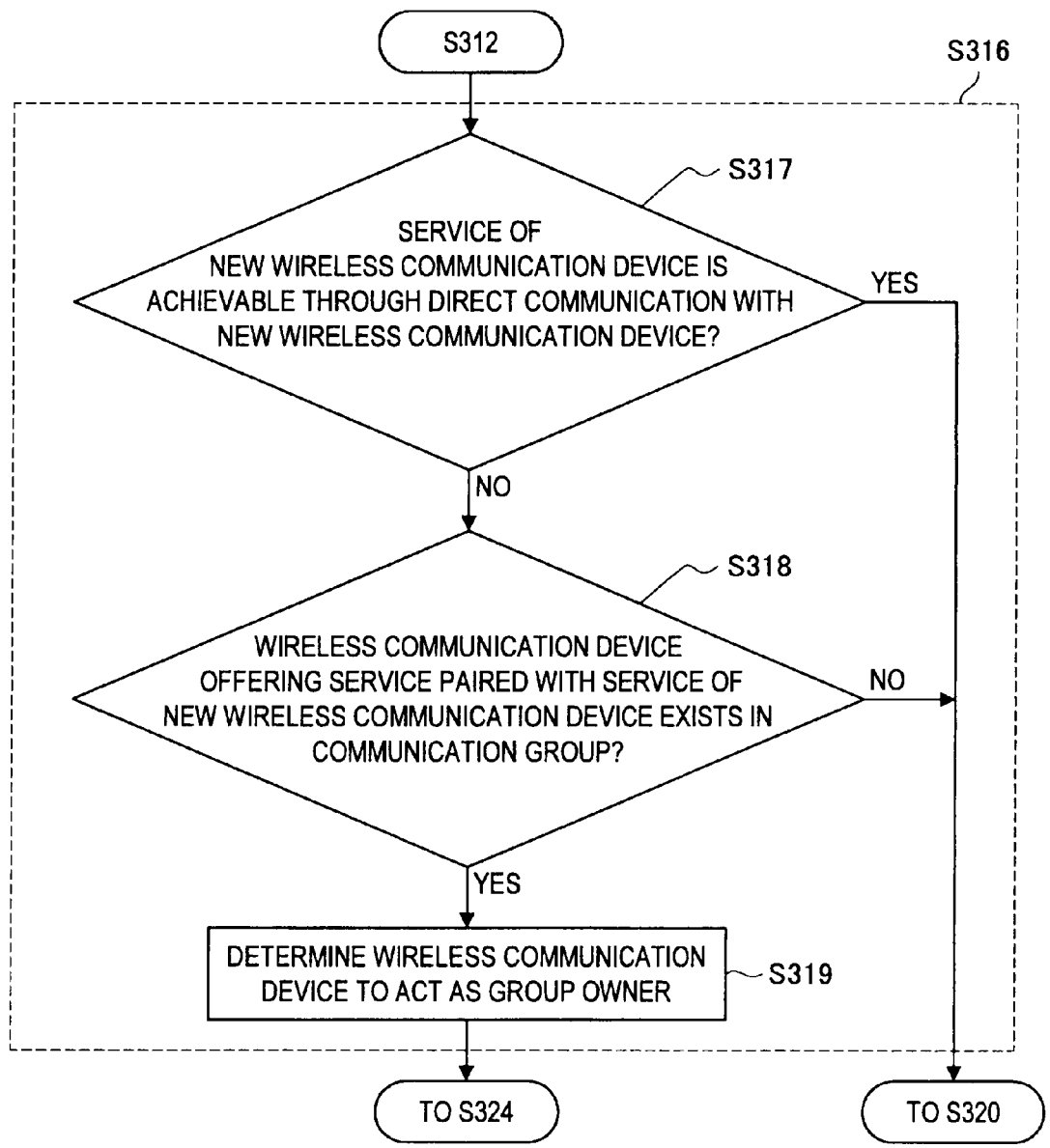
FIG. 6 is a flowchart showing an operation of a wireless communication device according to an embodiment of the present invention.

FIGS. 5 and 6 are flowcharts showing the operation of the wireless communication device 20 according to the embodiment of the present invention. FIGS. 5 and 6 show the processing of the wireless communication device 20 that forms a communication group with another wireless communication device 20 and acts as a group owner of the another wireless communication device 20.

First, as shown in FIG. 5, when a request for entry into the communication group is received from a new wireless communication device 20 (S304), the wireless communication device 20 accepts the new wireless communication device 20 into the communication group (S308). At this time, the new wireless communication device 20 enters the communication group tentatively as a client, for example.

After that, the wireless communication device 20 collects service information of the wireless communication device 20 in the communication group (S312). Specifically, the wireless communication device 20 collects service information indicating which function, such as DMS or DMR, each wireless communication device 20 uses from each of the wireless communication devices in the communication group.

Then, the wireless communication device 20 determines whether it is necessary to change the topology of the communication group based on the collected service information and its own service information (S316). The process of the determination in S316 is described in detail with reference to FIG. 6.

As shown in FIG. 6, the control unit 216 of the wireless communication device 20 determines whether the service of the new wireless communication device 20 is achievable through direct communication with the new wireless communication device 20 that has entered the group most recently (S317). Specifically, the control unit 216 of the wireless communication device 20 determines whether the wireless communication device 20 can execute the service paired with the service of the new wireless communication device 20.

For example, when the new wireless communication device 20 is DMS and the wireless communication device 20 is DMR which is paired with DMS, the control unit 216 determines that the service of the new wireless communication device 20 is achievable. On the other hand, when the new wireless communication device 20 and the wireless communication device 20 are both DMS, the control unit 216 determines that the service of the new wireless communication device 20 is not achievable.

When the control unit 216 of the wireless communication device 20 determines in S317 that the service of the new wireless communication device 20 is not achievable through direct communication between the wireless communication device 20 and the new wireless communication device 20, the control unit 216 makes determination shown in S318. Specifically, the control unit 216 determines whether another wireless communication device 20 that provides the service paired with the service of the new wireless communication device 20 exists in the communication group based on the service information collected in S312 (S318).

Then, when another wireless communication device 20 that provides the service paired with the service of the new wireless communication device 20 exists in the communication group, the control unit 216 of the wireless communication device 20 decides the another wireless communication device 20 as a device to act as a group owner (S319).

On the other hand, when it is determined in S317 that the service of the new wireless communication device 20 is achievable through direct communication between the wireless communication device 20 and the new wireless communication device 20 or determined in S318 that another wireless communication device 20 that provides the service paired with the service of the new wireless communication device 20 does not exist in the communication group, the wireless communication device 20 keeps the communication group and maintains the topology structure as shown in FIG. 5 (S320).

Further, when another wireless communication device 20 to act as a group owner is decided in S319, the wireless communication device 20 notify information indicating the another wireless communication device 20 which is decided to act as a group owner to each of the wireless communication devices 20 that make up the communication group.

After that, the wireless communication device 20 disconnects the connection with the other wireless communication devices 20 that make up the communication group and leaves the communication group (S328). Then, when the another wireless communication device 20 which is decided to act as a group owner actually starts operation as the group owner, the wireless communication device 20 makes connection to the another wireless communication device 20 that has started to act as the group owner (S332). A new communication group that centers on the another wireless communication device 20 that has started to act as the group owner is thereby formed.

Note that the another wireless communication device 20 that has been notified to act as a group owner may leave the communication group and perform role negotiation for deciding a parentage by setting priority to become a group owner to the highest value. In this configuration, the another wireless communication device 20 can start acting as a group owner.

<4. Specific Example of Topology Structure>

The operation of the wireless communication device 20 according to the embodiment of the present invention is described above with reference to FIGS. 5 and 6. Hereinafter, a specific example of a topology that is formed by the embodiment of the present invention is described hereinafter with reference to FIGS. 7 and 8.

FIRST EXAMPLE

Figure 7:
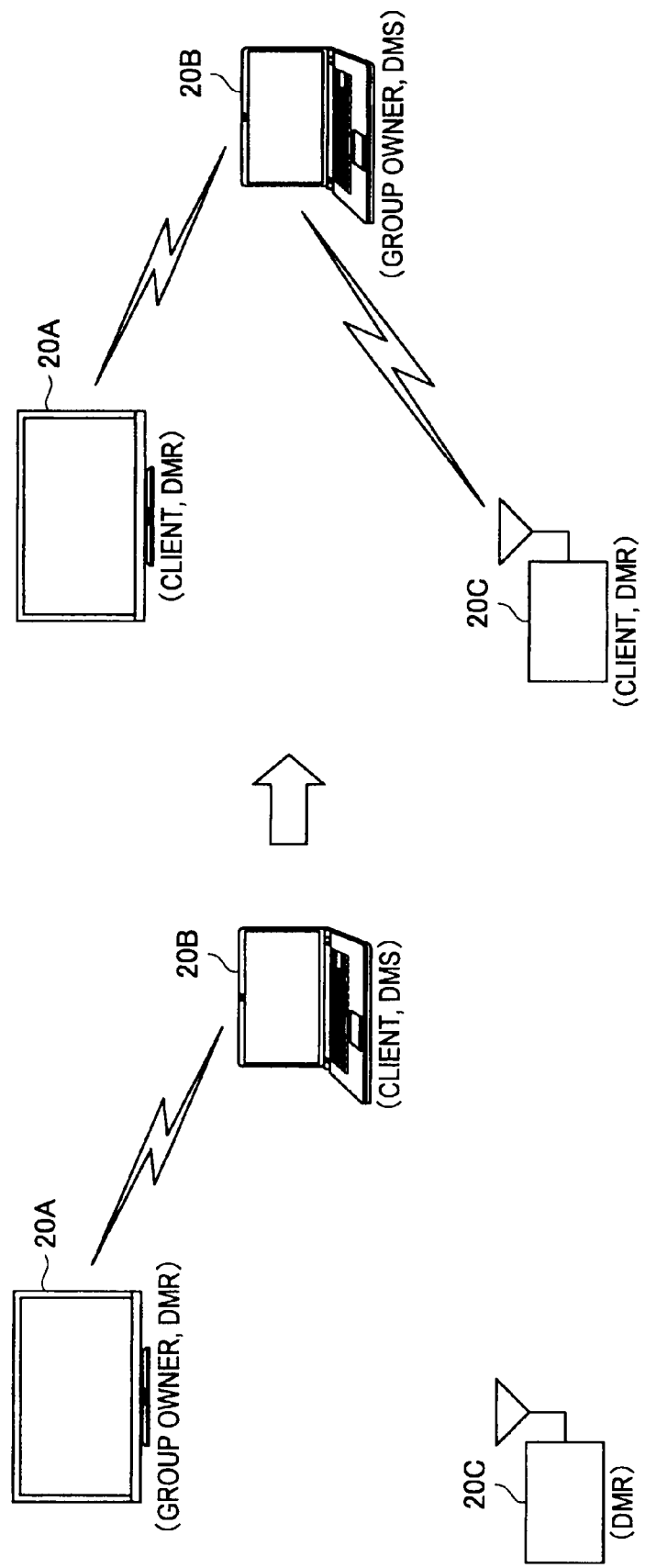
FIG. 7 is an explanatory view showing a specific structure example of a topology formed by an embodiment of the present invention.

First, a first example of the topology formed by the embodiment of the present invention is described with reference to FIG. 7. As shown in the left part of FIG. 7, the wireless communication device 20A that acts as a group owner and the wireless communication device 20B that acts as a client form a communication group. Further, a service in which the wireless communication device 20A serves as DMR and the wireless communication device 20B serves as DMS is in execution, and the wireless communication device 20C, which is DMR, intends to make a new entry into the communication group.

In this case, the wireless communication device 20A that acts as a group owner in the communication group determines whether the service of the wireless communication device 20C is achievable through direct communication with the wireless communication device 20C as shown in FIG. 6 (S317). In the example of FIG. 7, because the wireless communication device 20A and the wireless communication device 20C are both DMR, the wireless communication device 20A determines that the service of the wireless communication device 20C is not achievable through direct communication with the wireless communication device 20C.

Therefore, the wireless communication device 20A determines whether a wireless communication device that provides the service paired with the service of the new wireless communication device 20C exists in the communication group as shown in FIG. 6 (S318). In the example of FIG. 7, because the wireless communication device 20B in the communication group is DMS that is paired with DMR, the wireless communication device 20A extracts the wireless communication device 20B as the wireless communication device that provides the service paired with the service of the new wireless communication device 20.

Then, the wireless communication device 20A notifies the wireless communication device 20B and the wireless communication device 20C which make up the communication group that the wireless communication device 20B should act as a group owner, and the wireless communication device 20B starts operation as the group owner. Then, the wireless communication device 20A and the wireless communication device 20C enter the communication group as the clients of the wireless communication device 20B. Consequently, as shown in the right part of FIG. 7, the communication group is formed in which the wireless communication device 20B, which is DMS, is a group owner, and the wireless communication devices 20A and 20C, which are DMR, act as clients.

According to the topology, both of the service by the wireless communication device 20A and the wireless communication device 20B and the service by the wireless communication device 20C and the wireless communication device 20B can be implemented through direct communication without need of relay. It is thereby possible to simplify an information channel and reduce resources to use. Further, because there is no need for a terminal having a relay function, it is possible to determine an optimum topology structure without consideration of the presence or absence of the relay function.

SECOND EXAMPLE

Next, a second example of the topology formed by the embodiment of the present invention is described with reference to FIG. 8. As shown in the left part of FIG. 8, the wireless communication device 20A that acts as a group owner and the wireless communication device 20B that acts as a client form a communication group. Further, a service in which the wireless communication device 20A serves as DMR and the wireless communication device 20B serves as DMS is in execution, and the wireless communication device 20C, which is DMS, intends to make a new entry into the communication group.

In this case, the wireless communication device 20A that acts as a group owner in the communication group determines whether the service of the wireless communication device 20C is achievable through direct communication with the wireless communication device 20C as shown in FIG. 6 (S317). In the example of FIG. 8, because the wireless communication device 20A is DMR that is paired with the wireless communication device 20C which is DMS, the wireless communication device 20A determines that the service of the wireless communication device 20C is achievable through direct communication with the wireless communication device 20C.

Figure 8:
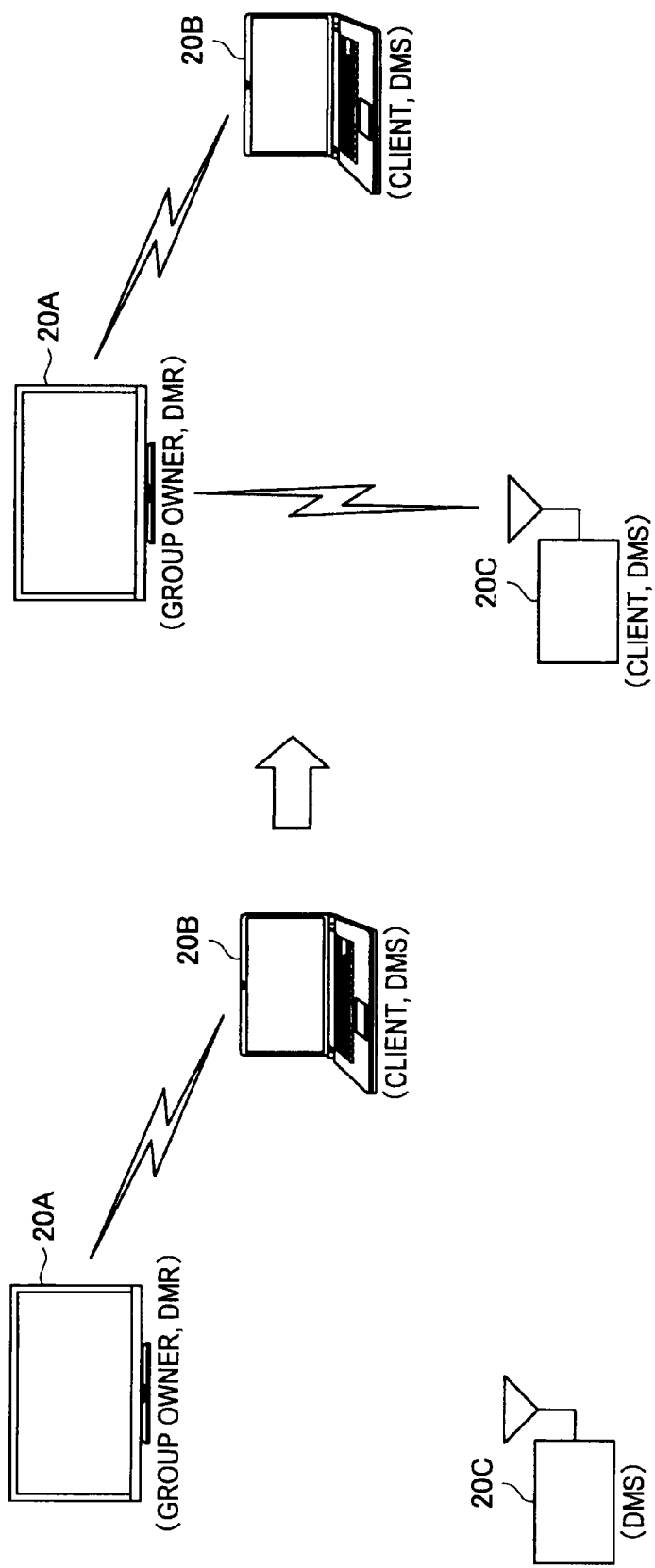
FIG. 8 is an explanatory view showing a specific structure example of a topology formed by an embodiment of the present invention.

Therefore, the communication group A maintains the topology in which the communication group A acts as a group owner as shown in the right part of FIG. 8. According to the topology, both of the service by the wireless communication device 20A and the wireless communication device 20B and the service by the wireless communication device 20C and the wireless communication device 20A can be implemented through direct communication without need of relay. This enables simplification of an information channel, reduction of resources to use and so on, just like the first example.

<5. Summary>

As described above, according to the embodiment of the present invention, the wireless communication device 20 acting as a group owner determines whether or not to change the topology of the communication group based on service information of each of the wireless communication devices 20 that make up the communication group. At this time, the wireless communication device 20 acting as a group owner decides a device to become a group owner so that the service desired by each wireless communication devices 20 can be achieved through direct communication without need of relay. Therefore, according to the embodiment of the present invention, it is possible to simplify an information channel and reduce resources to use.

It should be understood by those skilled in the art that various modifications, combinations, sub-combinations and alterations may occur depending on design requirements and other factors insofar as they are within the scope of the appended claims or the equivalents thereof.

For example, although DMS and DMR are described above as an example of services to be paired, services to be paired are not limited to DMS and DMR. As an alternative example, services to be paired may be more concrete services such as a music playing service and a music data providing service, a video playing service and a video data providing service, and a photograph display service and a photograph data providing service.

Although the example in which a new wireless communication device 20 enters the communication group formed by two wireless communication devices 20 is described above, the present invention is not limited thereto. For example, the present invention is applicable to the case where a new wireless communication device 20 enters a communication group formed by three or more wireless communication devices 20.

Further, it is not always necessary to perform the steps in the processing of the wireless communication device 20 of the specification in chronological order according to the sequence shown in the flowcharts. For example, the steps in the processing of the wireless communication device 20 may be processed in a difference sequence from the sequence shown in the flowcharts or may be processed in parallel.

Furthermore, it is possible to create a computer program that causes hardware such as a CPU, ROM and RAM incorporated in the wireless communication device 20 to perform the equal functions to the elements of the wireless communication device 20 described above. Further, a storage medium that stores such a computer program may be provided.

The present application contains subject matter related to that disclosed in Japanese Priority Patent Application JP 2010-113416 filed in the Japan Patent Office on May 17, 2010, the entire content of which is hereby incorporated by reference.

What is claimed is:

1. A wireless communication device comprising:
a processing circuit configured to
control the wireless communication device to operate as a group owner or a client; and
communicate with another wireless communication device based on the control operation, wherein the processing circuit receives service information indicating a service provided by each of the another wireless communication device and a new wireless communication device, the service information being one of a digital media renderer and a digital media server, and
wherein, when a communication group is formed that has a topology in which the wireless communication device acts as a group owner and the another wireless communication device acts as a client of the wireless communication device, and when the new wireless communication device enters the communication group, the processing circuit is further configured to determine whether to change the topology of the communication group based on which particular services are provided by each of the communication devices, wherein changing the topology of the communication group includes designating a new group owner for the changed communication topology.

2. The wireless communication device according to claim 1, wherein
when the wireless communication device is compatible with the service provided by the new wireless communication device, the processing circuit controls the wireless communication device to keep acting as a group owner.

3. The wireless communication device according to claim 2, wherein
when the wireless communication device and the another wireless communication device both are not compatible with the service provided by the new wireless communication device, the processing circuit is further configured to control the wireless communication device to keep acting as a group owner.

4. The wireless communication device according to claim 3, wherein
when the wireless communication device is not compatible with the service provided by the new wireless communication device and the another wireless communication device is compatible with the service provided by the new wireless communication device, the processing circuit is further configured to decide to make the another wireless communication device act as a group owner.

5. The wireless communication device according to claim 4, wherein
when the another wireless communication device is made to act as a group owner, the processing circuit is further configured to transmit information indicating the another wireless communication device.

6. The wireless communication device according to claim 5, wherein after transmission of the information, the processing circuit is further configured to control the wireless communication device to leave the communication group and form a communication group where the wireless communication device acts as a client again with the another wireless communication device.

7. A wireless communication method comprising:
controlling a wireless communication device to operate as a group owner or a client;
communicating with another wireless communication device based on the controlling operation;
receiving service information indicating a service provided by each of the another wireless communication device and a new wireless communication device, the service information being one of a digital media renderer and a digital media server; and
determining, when a communication group is formed that has a topology in which the wireless communication device acts as the group owner and the another wireless communication device acts as the client of the wireless communication device, and when the new wireless communication device enters the communication group, whether to change the topology of the communication group based on which particular services are provided by each of the communication devices, wherein changing the topology of the communication group includes designating a new group owner for the changed communication topology.

8. A non-transitory computer readable medium having stored thereon a program that when executed by a computer causes the computer to execute a method comprising:
controlling a wireless communication device to operate as a group owner or a client;
communicating with another wireless communication device based on the controlling operation;
receiving service information indicating a service provided by each of the another wireless communication device and a new wireless communication device, the service information being one of a digital media renderer and a digital media server; and determining, when a communication group is formed that has a topology in which the wireless communication device acts as the group owner and the another wireless communication device acts as the client of the wireless communication device, and when the new wireless communication device enters the communication group, whether to change the topology of the communication group based on which particular services are provided by each of the communication devices, wherein changing the topology of the communication group includes designating a new group owner for the changed communication topology.

9. A wireless communication system comprising:

a first wireless communication device; and a second wireless communication device, wherein, when a communication group is formed that has a topology in which the first wireless communication device operates as a group owner and the second wireless communication device acts as a client of the first wireless communication device, and when a new wireless communication device enters the communication group, the first wireless communication device determines whether to change the topology of the communication group based on which particular services are provided by each of the communication devices, the service information being one of a digital media renderer and a digital media server, and wherein a change in the topology of the communication group includes designating a new group owner for the changed topology.

* * * * *